United States Patent
Funaki et al.

[11] Patent Number: 5,833,792
[45] Date of Patent: Nov. 10, 1998

[54] METHOD FOR PRODUCING A LAMINATED THERMOPLASTIC RESIN FILM, A LAMINATED THERMOPLASTIC RESIN FILM AND A THERMALLY PRODUCED MOLDING OF THE SAME

[75] Inventors: Akira Funaki; Katsumi Uchiyama; Tohru Yukumoto; Atsushi Fujii, all of Himeji, Japan

[73] Assignee: Idemitsu Petrochemical Co., Ltd., Tokyo, Japan

[21] Appl. No.: 760,200

[22] Filed: Dec. 4, 1996

[30] Foreign Application Priority Data

Dec. 5, 1995 [JP] Japan .................................. 7-316614
Jun. 24, 1996 [JP] Japan .................................. 8-163400

[51] Int. Cl.$^6$ .................................................. B32B 27/06
[52] U.S. Cl. ................................ 156/244.27; 428/411.1; 156/324
[58] Field of Search ........................... 156/242, 244.11, 156/247, 249, 324, 244.27; 428/411.1

[56] References Cited

U.S. PATENT DOCUMENTS

| | | | |
|---|---|---|---|
| 2,719,564 | 10/1955 | Schneider | 156/209 |
| 3,033,707 | 5/1962 | Lacy et al. | 428/215 |
| 3,371,002 | 2/1968 | Reddeman | 156/244.17 |
| 3,526,000 | 8/1970 | Williams | 156/82 |
| 3,615,973 | 10/1971 | Meeder | 156/79 |

*Primary Examiner*—Francis J. Lorin
*Attorney, Agent, or Firm*—Flynn, Thiel, Boutell & Tanis, P.C.

[57] ABSTRACT

A first thermoplastic resin film is laid on a heated endless belt to be moved together with the endless metal belt, a second thermoplastic resin film is superposed on the first thermoplastic resin film laid on the belt, and the first and second thermoplastic resin films laid on the belt are touch-rolled by a combination of the belt and a second roller to be laminated. The second thermoplastic resin film can be superposed on the first thermoplastic resin film laid on the belt after being touched to the second roller. A thermally produced molding is obtained by heat treating the laminated thermoplastic resin film.

21 Claims, 10 Drawing Sheets

F I G. 9
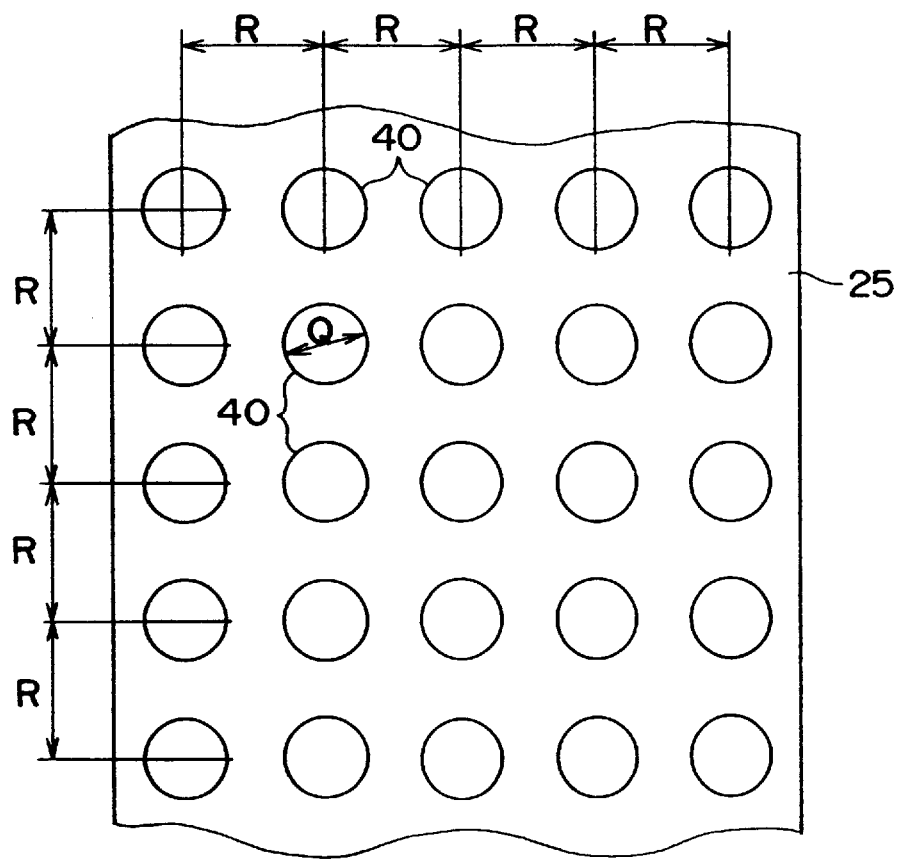

METHOD FOR PRODUCING A LAMINATED THERMOPLASTIC RESIN FILM, A LAMINATED THERMOPLASTIC RESIN FILM AND A THERMALLY PRODUCED MOLDING OF THE SAME

BACKGROUND OF THE INVENTION

1. Field of the Invention

This invention relates to a thermoplastic resin film having a laminated structure, a method for producing the same and a thermally produced molding of the same.

2. Description of Related Art

As shown in FIG. 10, there is the art in which a laminated sheet 53 is obtained by laminating a printed oriented film 51 and an extrusion-molded thermoplastic resin film 52.

More specifically, the laminated sheet 53 is produced by moving the thermoplastic resin film 52, molded by being extruded from a die 55 of an extruder 54, along the rotation of a roller 56 while being adhered on the surface of the roller 56 with the temperature being controlled, and then by superposing the printed film 51 on the thermoplastic resin film 52 through a silicone rubber roller 57. Incidentally, in the roller 56, the heating temperature is, for example, 70° C., and the rotational speed is, for example, 20 m/min.

According to the extrusion-lamination method, there is a disadvantage of a wrinkle being easily produced on a part of the film 51 of the laminated sheet 53. And when the printed film 51 is composed of an oriented film, a shrinkage becomes greater, and further, the shrinkage is hardly controlled to be within the small fixed range. The above disadvantages become conspicuous, especially, in the case of pitch printing in which printing is carried out at equal intervals. In the extruded laminating method, when the speed of laminating is increased, the fine laminated sheet 53 cannot be obtained, since air is gulped between the oriented film 51 and the thermoplastic resin film 52 or wrinkles are produced on the oriented film 51.

In order to eliminate the disadvantages, in the actual situation, a dry-laminating method is employed instead of the producing method.

According to the dry-laminating method, in which an adhesive is used, a system for coating the adhesive and dry solvent is required, therefore there is a disadvantage of the producing apparatus becoming large with complexity increasing and the cost becoming high.

SUMMARY OF THE INVENTION

A method for producing a laminated thermoplastic resin film according to a first aspect of the present invention is characterized by the steps of: moving a first thermoplastic resin film together with a belt by laying the first thermoplastic resin film on the heated belt, superposing a second thermoplastic resin film on the first thermoplastic resin film laid on the belt; and touch-rolling the first and second thermoplastic resin films laid on the belt by a combination of the belt and a roller to laminate the first and second thermoplastic resin films.

By the structure as described above, it is possible to avoid shrinkage of the first thermoplastic resin film and avoid generation of wrinkling on the first thermoplastic resin film during laminating.

Any type of thermoplastic resin such as polystyrene, polyethylene, polypropylene, nylon-6, nylon-66 and so on is used as the thermoplastic resin.

A sheet which is relatively thick as compared with a film may be included in the thermoplastic resin film.

The belt can be a metallic endless belt of stainless steel processed for a mirror face and the like.

The temperature for heating the belt exerts an influence upon the adhesive strength between the thermoplastic resin films, so that the specific heating temperature is dependent upon the type of resin. Therefore, depending upon the type of a thermoplastic resin film to be used, the heating temperature may be selected to obtain the preferable adhesive strength.

The laminated thermoplastic resin film according to the invention may include the first and second thermoplastic resin films, but also may include, for example, a third thermoplastic resin film.

In the first aspect of the present invention, the second thermoplastic resin film may touch the roller and thereafter may be superposed on the first thermoplastic resin film on the belt to laminate the first and second thermoplastic resin films.

By touching the second thermoplastic resin film to the roller as described above, an arrangement or an inserting angle of the second thermoplastic resin film to the first thermoplastic resin film can be controlled satisfactorily, resulting in further improvement for speeding up the production.

The belt is an endless belt wound on and between at least two rollers, and the roller mentioned in the first aspect of the invention and one of the rollers located inside the circle of the endless belt may be arranged so as to be abutted to each other through the endless belt.

The first thermoplastic resin film may be laid on the heated belt through an elastic roller having an elastic portion on the surface thereof.

It is desirable to use silicone rubber having thermal resistance as the elastic portion.

The use of the elastic roller as described above eliminates possibility to gulp air between the first and second thermoplastic resin films and produce wrinkles on the first thermoplastic resin film, even when the speed of lamination is increased.

The elastic roller is provided with a temperature controlling roller in order to control the temperature of the surface of the elastic roller in such a way as to abut to the surface of the elastic roller.

The temperature controlling roller has a passage of heat transfer medium for controlling the temperature formed therein. More than two of the temperature controlling rollers can be provided as necessary.

It is desirable that the temperature difference between the temperature of the surface of the elastic roller and the temperature of a heat transfer medium inside the elastic roller is maintained to be less than 80° C.

The surface temperature of the elastic roller should be basically the temperature of the part having the highest temperature (a part closest to the belt), but, as a matter of fact, it is impossible to measure, therefore, the surface temperature is the temperature of the position just before the first thermoplastic resin film touches the elastic roller.

In order to control variation of the printing pitch printed on the first thermoplastic resin film, it is necessary to control the surface temperature of the elastic roller to be less than a specified temperature, therefore a difference between the surface temperature of the elastic roller and the temperature of the heat transfer medium inside of the elastic roller is maintained to be less than 80° C.

The specified temperature is decided by properties of the first thermoplastic resin film. For example, in the case of an oriented polystyrene film, it is necessary that the temperature of the elastic roller is less than 80° C. In the case in which a general heat transfer medium and facilities are used, the minimum temperature of the heat transfer medium is around 3° C. Therefore, by defining the temperature difference to be less than 80° C., the necessary range is specified.

Further the first thermoplastic resin film laid on the belt is preferably preheated at more than 40° C.

The preheating temperature of the first thermoplastic resin film is defined as more than 40° C., but the maximum temperature should be a temperature which allows the first thermoplastic resin film to be peeled from a preheating means. In the case of less than 40° C., any disadvantage is not produced in the low-speed production, but in the high-speed production, air is sometimes gulped between the belt and the first thermoplastic resin film.

The touch-rolling, the compressive force for the first and second thermoplastic resin films laid on the belt, by a combination of the belt and roller is carried out at more than 0.01 MPa.

The touch-rolling force, the compressive force, is obtained by tension only on the belt. The maximum force is not especially limited, but is, for example, approximately 1 MPa based on the durability and the material of the belt.

It is preferable that a peeling property substance is coated on the face of the first thermoplastic resin film, which is to be contacted with the belt, and that thereafter the first thermoplastic resin film is laid on the belt.

As the peeling property substance, silicone emulsion or the like in a liquid, and starch particles, silicone particles, acrylic resin particles or the like in a solid can be used.

The coating of the peeling property substance can be carried out in either an in-line or an on-line method (using a film previously coated with the peeling property substance).

As described above, the peeling property substance is coated on the face of the first thermoplastic resin film, which is to be contacted with the belt, therefore, even in a high-speed production, the laminated thermoplastic resin film can be smoothly peeled from the belt without reducing the temperature of the belt.

It is preferable that after touch-rolling the first and second thermoplastic resin films laid on the belt by a combination of the belt and the roller, the laminated first and second thermoplastic resin films are cooled by a cooling means and then the first and second thermoplastic resin films are peeled from the belt.

A structure of the cooling means can be any spray device such as, for example, a spray device of air, water or the like.

Further, it is preferable that an auxiliary roller for touch-rolling arranged at the side of the back face of the belt assists in the touch-rolling for the first and second thermoplastic resin films laid on the belt by a combination of the belt and the roller.

The pressurized force by the auxiliary roller for touch-rolling is, for example, 0.98–9.8 MPa.

In the present invention, it is preferable that the belt has the degree of the surface roughness (average roughness of the center line: Ra) of 0.001 $\mu m \leq Ra \leq 0.80$ $\mu m$.

When the Ra is smaller than 0.001 $\mu m$, the adhesion between the laminated thermoplastic resin film and the belt is too high, and as a result, the peeling is insufficient in the high-speed production. And when Ra is larger than 0.80 $\mu m$, glossiness of the face of the laminated thermoplastic resin film, facing to the belt, is extremely reduced. Preferably, Ra is more than 0.005 $\mu m$, and more preferably, is more than 0.01 $\mu m$.

In the present invention, the second thermoplastic resin film can be molded by being directly extruded from an extruder.

The laminated thermoplastic resin film according to a second aspect of the present invention is characterized by being produced by moving the first thermoplastic resin film, laid on the heated belt, together with the belt, superposing the second thermoplastic resin film on the first thermoplastic resin film laid on the belt, and touch-rolling the first and second thermoplastic resin films laid on the belt by a combination of the belt and roller to laminate the first and second thermoplastic resin films.

That is to say, the larminated thermoplastic resin film according to the invention is obtained by the producing method in the first aspect of the invention.

A thermally produced molding of the laminated thermoplastic resin film according to a third aspect of the present invention is characterized by being produced by moving the first thermoplastic resin film, laid on the heated belt, together with the belt, superposing the second thermoplastic resin film on the first thermoplastic resin film laid on the belt, touch-rolling the first and second thermoplastic resin films laid on the belt by a combination of the belt and the roller to thereby produce the laminated thermoplastic resin film, and heat treating said laminated thermoplastic resin film.

In the third aspect of the invention, the first and second thermoplastic resin films are resin of a polystyrene type; and the first thermoplastic resin film has a printed face.

When the printing face is formed on the first thermoplastic resin film as mentioned above, the coefficient of variation in pitch on the printing face after the lamination can be defined as less than $2.5 \times 10^{-3}$, with the result that the rate of changing pitch before and after lamination can be controlled to be less than 1%.

Further, in the third aspect of the invention, the thermally produced molding from the laminated thermoplastic resin film is a lid of a container.

BRIEF DESCRIPTION OF THE DRAWINGS

FIG. 9 is a plane view showing a printing pattern of a first thermoplastic resin film of the experiments.

DETAILED DESCRIPTION OF THE PREFERRED EMBODIMENT(S)

[FIRST EMBODIMENT]

Figure 1:
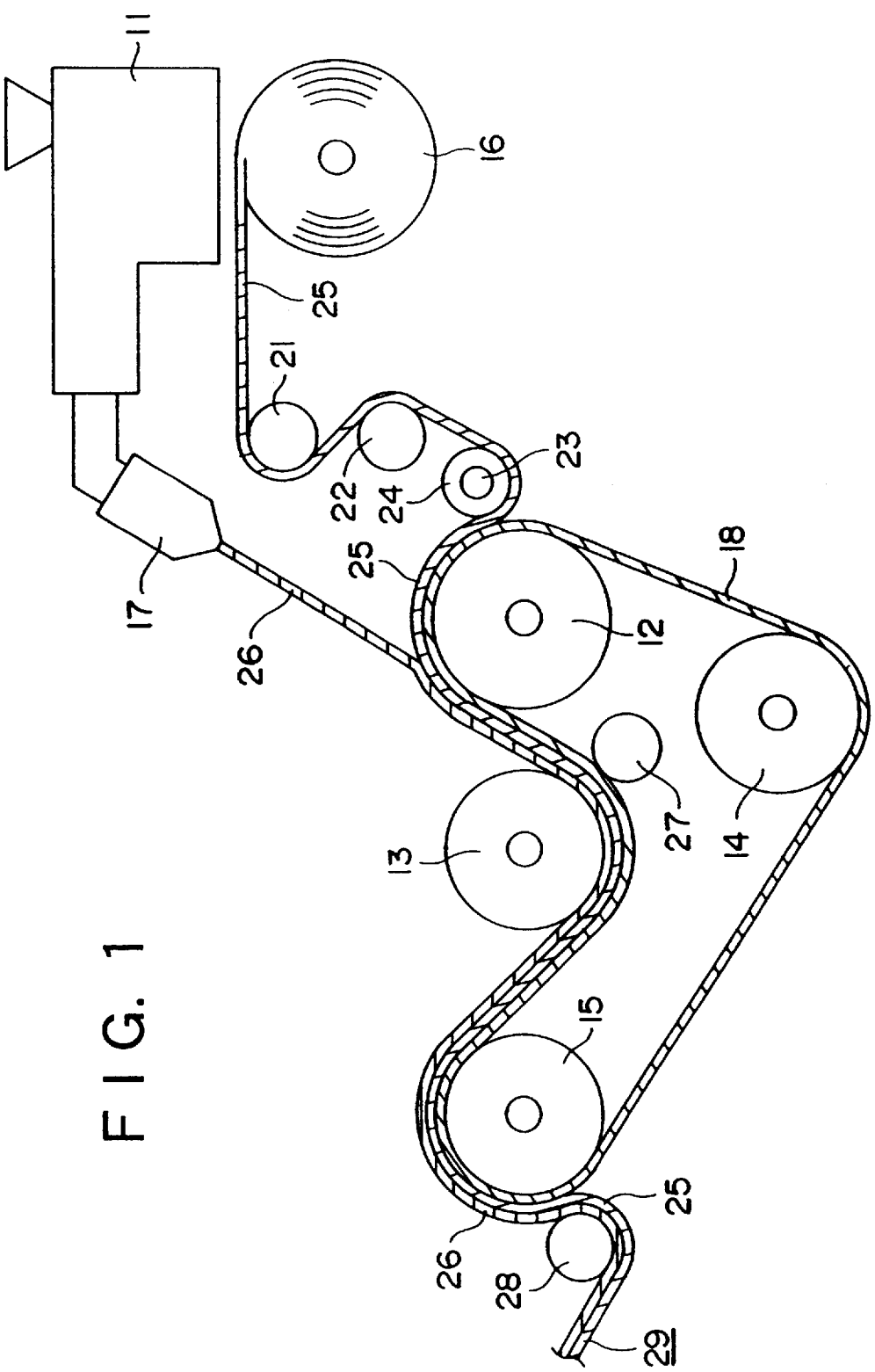
FIG. 1 is a diagrammatic view of an apparatus used in a producing method according to a first embodiment of the present invention.

A method for producing a laminated thermoplastic resin film 29 as a laminated flat face-like thermoplastic resin according to a first embodiment of the present invention will be explained with reference to FIG. 1.

First of all, a structure of a producing apparatus used in the producing method will be described.

the producing apparatus has an extruder 11, a first roller 12 for heating, a second roller 13, a third roller 14 for heating, a fourth roller 15 for cooling, a sending roller 16 and so on.

The extruder 11 is, for example, a single-shaft extruder and has a die 17 at its end.

The first and second rollers 12 and 13, and the roller 15 are arranged to be approximately aligned. On the other hand, the third roller 14 is arranged at such a position to oppose to the three rollers 12, 13 and 15.

Further, an endless belt 18 is wound around the circumference of the rollers 12, 15 and 14 in such a way as to locate the first roller 12, the fourth roller 15 and the third roller 14 in the inside of the endless belt 18. The second roller 13 is located at such a position that the second roller pushes the endless belt 18 inwards from the outside of the endless belt 18. The endless belt 18 is made of stainless steel, and the surface thereof is processed to have a mirror face. Incidentally, the third roller 14 gives tension to the endless belt 18 in order to provide curving control.

In the inside of each of the rollers 12, 14 and 15 for heating and cooling, a heating device or a cooling device is incorporated.

Between the sending roller 16 and the first roller 12, first and second preheating rollers 21 and 22 and an elastic roller 23 are provided. The elastic roller 23 has an elastic portion 24 made of silicone rubber on the surface thereof. In the inside of the elastic roller 23, a passage (not shown) for a heat transfer medium is formed.

On a shaft portion of the sending roller 16, a powder brake for controlling tension of the thermoplastic resin film is provided.

On the back-side of the endless belt 18 adjacent to the second roller 13, provided is an auxiliary roller for touch-rolling, compressing, 27 to assist in touch-rolling the first and second thermoplastic resin films 25 and 26 against the roller 13.

Adjacent to the fourth roller 15, a peeling roller 28 used for peeling the first and second thermoplastic resin films 25 and 26 from the endless belt 18 is provided.

Next, the producing method of the laminated thermoplastic resin film 29, while using the producing apparatus, will be described.

The first thermoplastic resin film 25 is rolled away from the sending roller 16, and after the thermoplastic resin film 25 is preheated, while moving in an S-shaped curve, by the first and second preheating rollers 21 and 22, the thermoplastic resin film 25 is adherently laid on the endless belt 18 locating on the first roller 12 by the elastic roller 23, and then the thermoplastic resin film 25 is moved together with the endless belt 18.

Following the above, on the first thermoplastic resin film 25 located on the first roller 12, the second thermoplastic resin film 26 molded by being extruded from the die 17 of the extruder 11 is superposed, and thereafter the first and second thermoplastic resin films 25 and 26 are moved together with the endless belt 18 to the second roller 13. Here, the endless belt 18 causes the first and second thermoplastic resin films 25 and 26 to touch-roll against the second roller 13. At this time, in a section of the endless belt 18 at which the auxiliary roller for touch-rolling 27 is positioned, the auxiliary roller for touch-rolling 27 assists in touch-rolling the first and second thermoplastic resin film 25.

Then, after the laminated first and second thermoplastic resin films 25 and 26 are moved together with the endless belt 18 to the fourth roller 15 so as to be cooled, the films 25 and 26 are peeled away from the endless belt 18, resulting in the laminated thermoplastic resin film 29 of the embodiment.

[SECOND EMBODIMENT]

Figure 2:
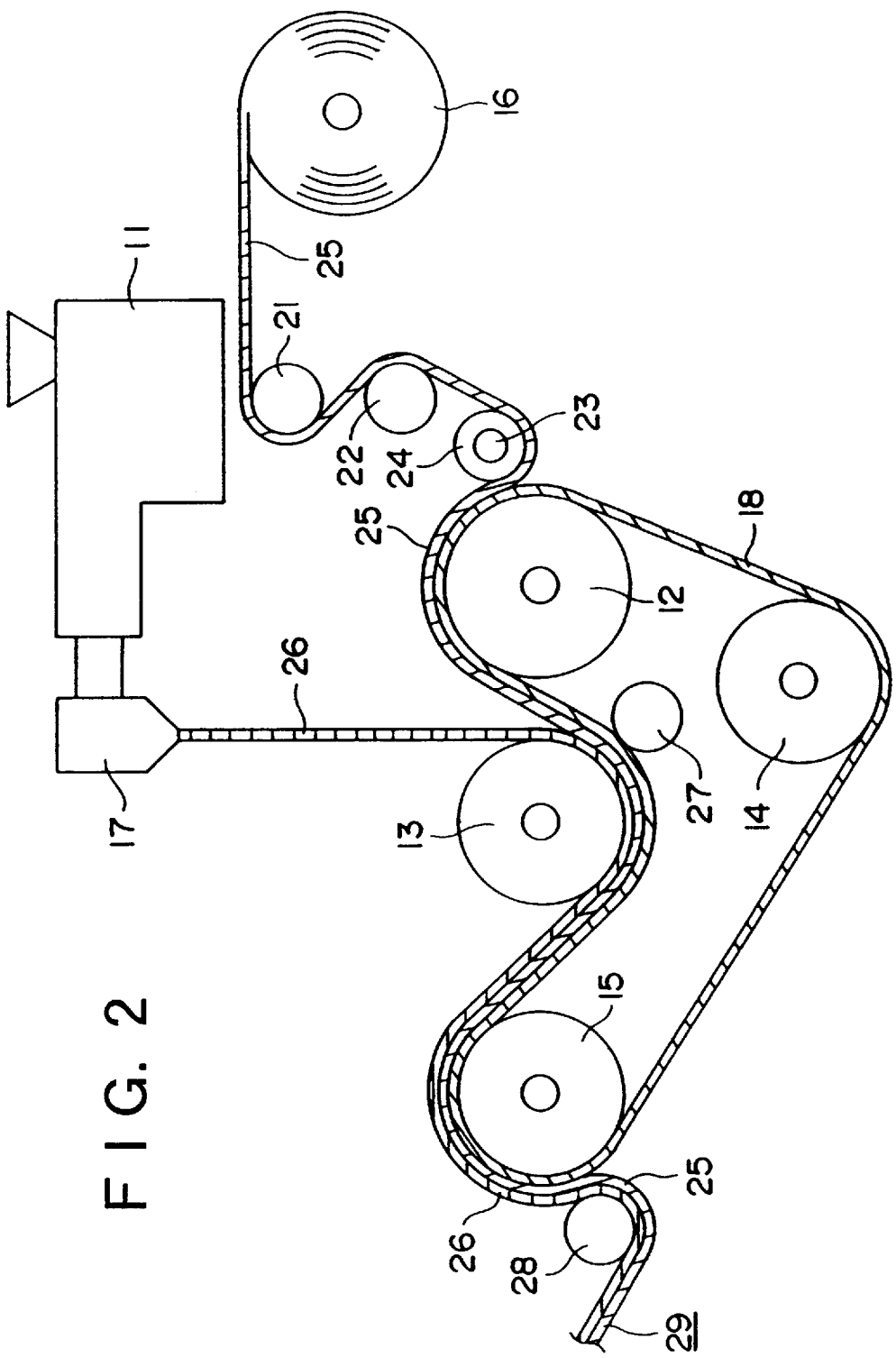
FIG. 2 is a diagrammatic view of an apparatus used in a producing method according to a second embodiment of the present invention.

The method for producing the laminated thermoplastic resin film according to a second embodiment of the present invention will be explained with reference to FIG. 2.

The structure of the producing apparatus used in the producing method of the second embodiment is the same as the producing apparatus relating to the first embodiment.

The producing method of the laminated thermoplastic resin film 29 of the embodiment is distinguished by a different position for supplying the second thermoplastic resin film 26, but the other points are the same as those in the producing method of the first embodiment.

That is to say, in the embodiment, the second thermoplastic resin film 26 molded by being extruded from the die 17 touches the second roller 13 first and foremost, instead of being immediately laid on the first thermoplastic resin film 25 lying on the endless belt 18, and then is superposed on the first thermoplastic resin film 25 lying on the endless belt 18.

[THIRD EMBODIMENT]

Figure 3:
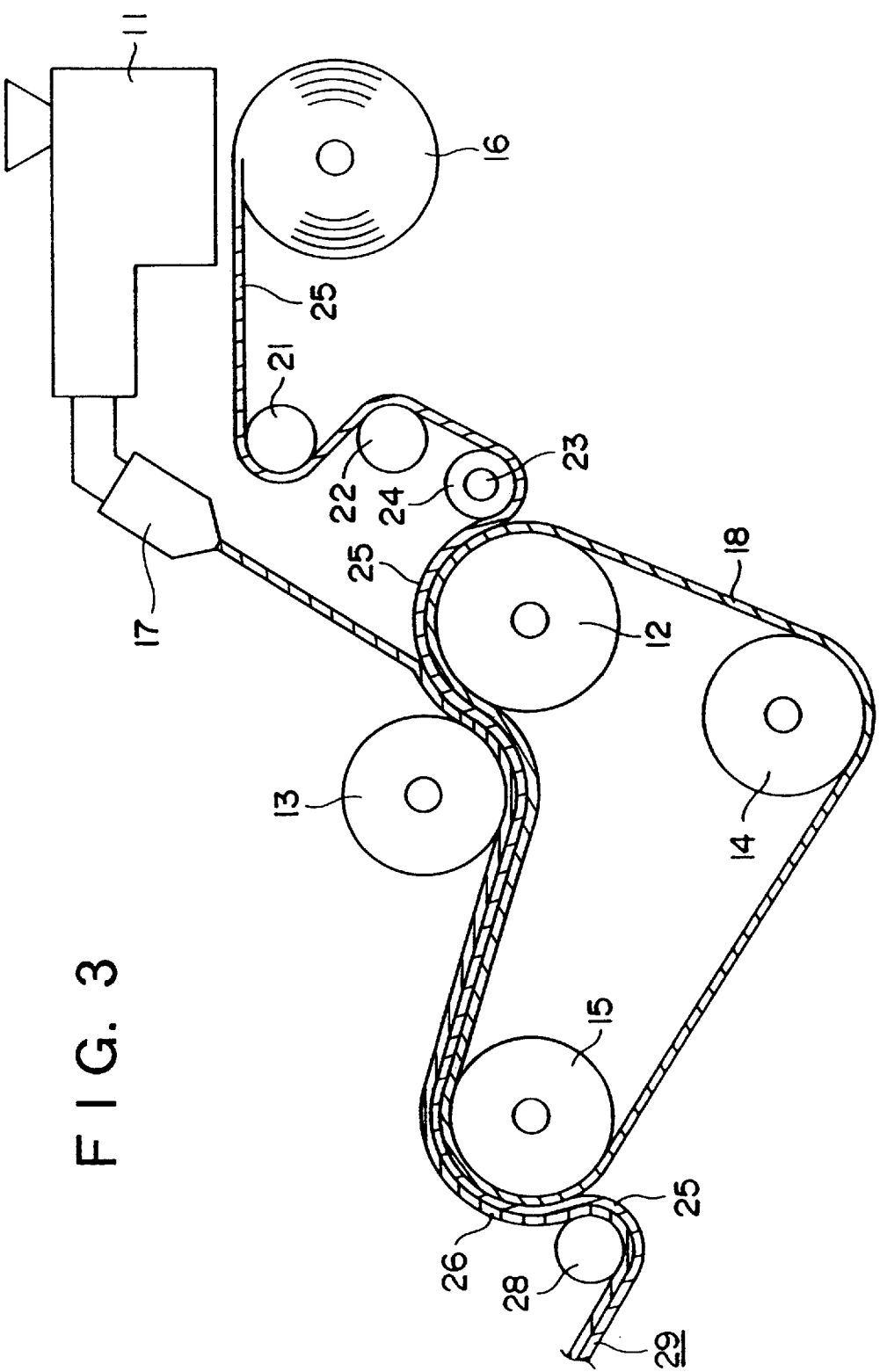
FIG. 3 is a diagrammatic view of an apparatus used in a producing method according to a third embodiment of the present invention.

The method for producing the laminated thermoplastic resin film according to a third embodiment of the present invention will be explained with reference to FIG. 3.

A producing apparatus used in the producing method of the third embodiment is distinguished by a different arrangement of the first roller 12 and the second roller 13 and by a specified range defined for the degree of surface roughness of the endless belt 18, but the other points are the same as those in the producing apparatus according to the first embodiment.

More specifically, in the embodiment, the first roller 12 and the second roller 13 are arranged to be abutted to each other through the endless belt 18. Incidentally, the auxiliary roller for touch-rolling 27, according to the first embodiment is not provided, because the touch-rolling effect for the first and second thermoplastic resin films 25 and 26 can be obtained by both rollers 12 and 13.

The endless belt 18 is one having the degree of surface roughness (average roughness of the center line: Ra) within the range of $0.001\ \mu m \leq Ra \leq 0,80\ \mu m$.

The producing method of the laminated thermoplastic resin film 29 according to the embodiment is similar to the first embodiment, in which both films 25 and 26 are guided into an area between the first roller 12 and the second roller 13 to be laminated by being touch-rolled by both rollers 12 and 13 after the second thermoplastic resin film 26 is superposed on the firs thermoplastic resin film 25 located on the first roller 12.

[FOURTH EMBODIMENT]

Figure 4:
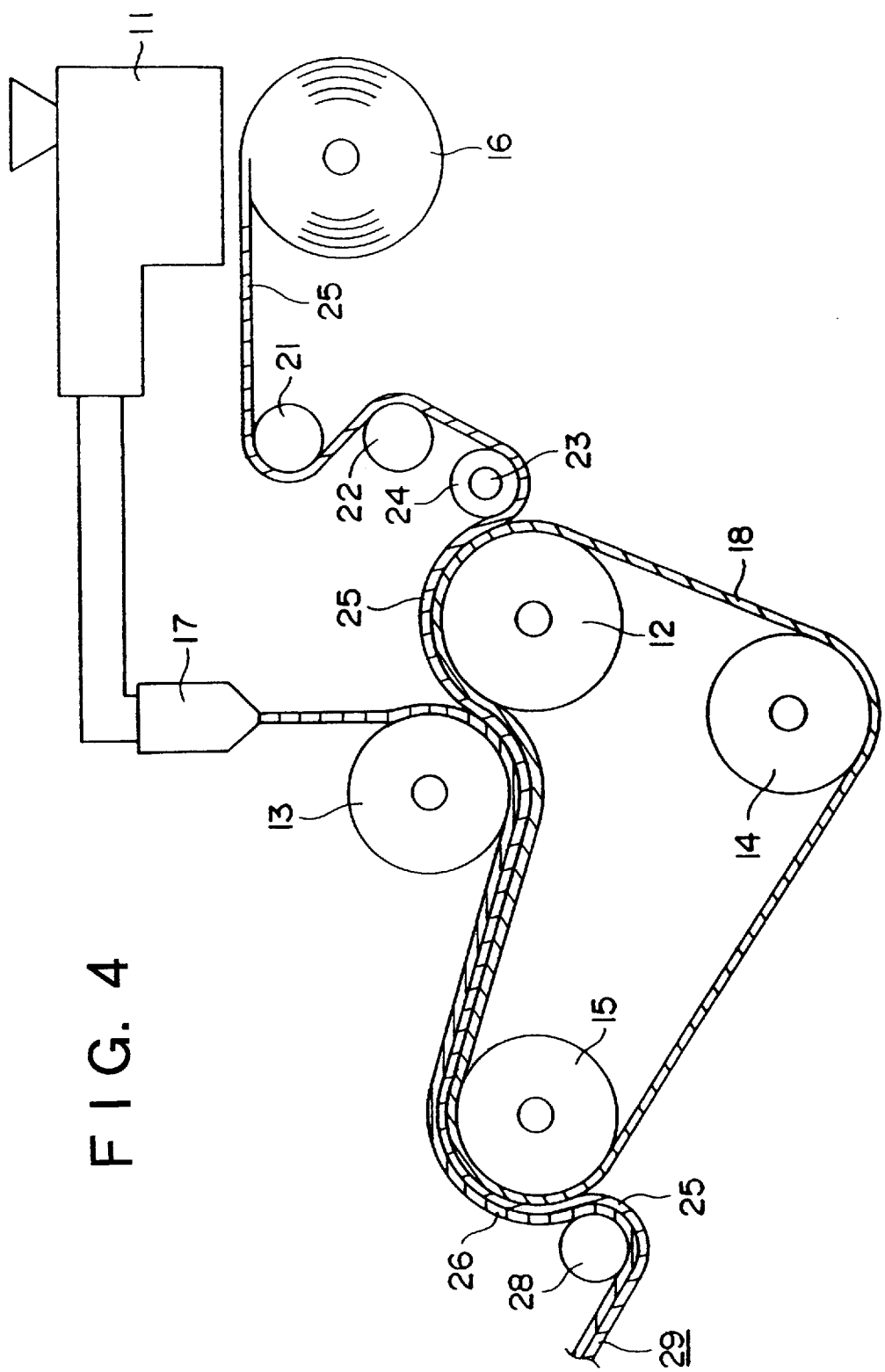
FIG. 4 is a diagrammatic view of an apparatus used in a producing method according to a fourth embodiment of the present invention.

The method for producing the laminated thermoplastic resin film according to a fourth embodiment of the present invention will be explained with reference to FIG. 4.

The producing apparatus used in the producing method of the fourth embodiment is distinguished by a different arrangement of the first roller 12 and the second roller 13, but the other points are the same as those in the producing apparatus according to the second embodiment.

More specifically, in the embodiment, the first roller 12 and the second roller 13 are located to be abutted to each other through the endless belt 18. Incidentally, the auxiliary roller for touch-rolling 27 according to the second embodiment is not provided.

The producing method of the laminated thermoplastic resin film 29 according to the embodiment is similar to the second embodiment, in which the film 26 is superposed on the first thermoplastic resin film 25 laid on the endless belt 18 after the second thermoplastic resin film 26 touches the second roller 13, and then both films 25 and 26 are guided into an area between the first roller 12 and the second roller 13 to be laminated by being touch-rolled by both rollers 12 and 13.

[FIFTH EMBODIMENT]

Figure 5:
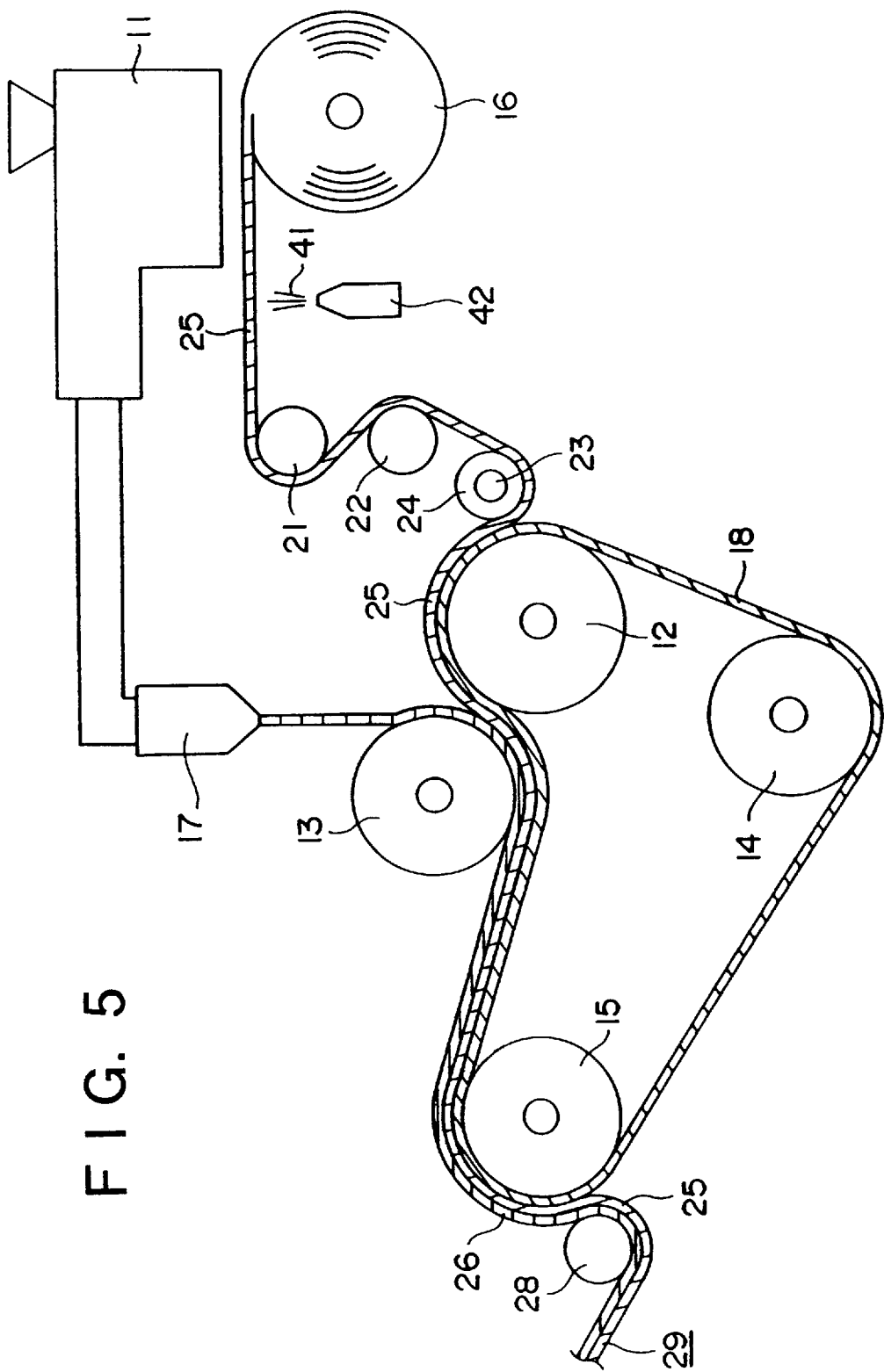
FIG. 5 is a diagrammatic view of an apparatus used in a producing method according to a fifth embodiment of the present invention.

The method for producing the laminated thermoplastic resin film according to a fifth embodiment of the present invention will be explained with reference to FIG. 5.

The producing apparatus used in the producing method of the fifth embodiment is distinguished by providing a coating device 42 for a peeling property substance 41, but in the other points, is the same as the producing apparatus according to the fourth embodiment.

More specifically, in the embodiment, the coating device 42 for the peeling property substance 41 is provided between the sending roller 16 and the first preheating roller 21. The coating device 42 is located at the same side of the film 25 as the side to which the endless belt 18 faces so as to coat the face of the first thermoplastic resin film 25 which is to contact the endless belt 18 with the peeling property substance 41.

The producing method of the laminated thermoplastic resin film 29 according to the embodiment is similar to the fourth embodiment, in which the first thermoplastic resin film 25 rolled out from the sending roller 16 is coated with the peeling property substance 41 in such a way that the peeling property substance 41 is sprayed on the face thereof which is to contact the endless belt 18, from the coating device 42.

[SIXTH EMBODIMENT]

Figure 6:
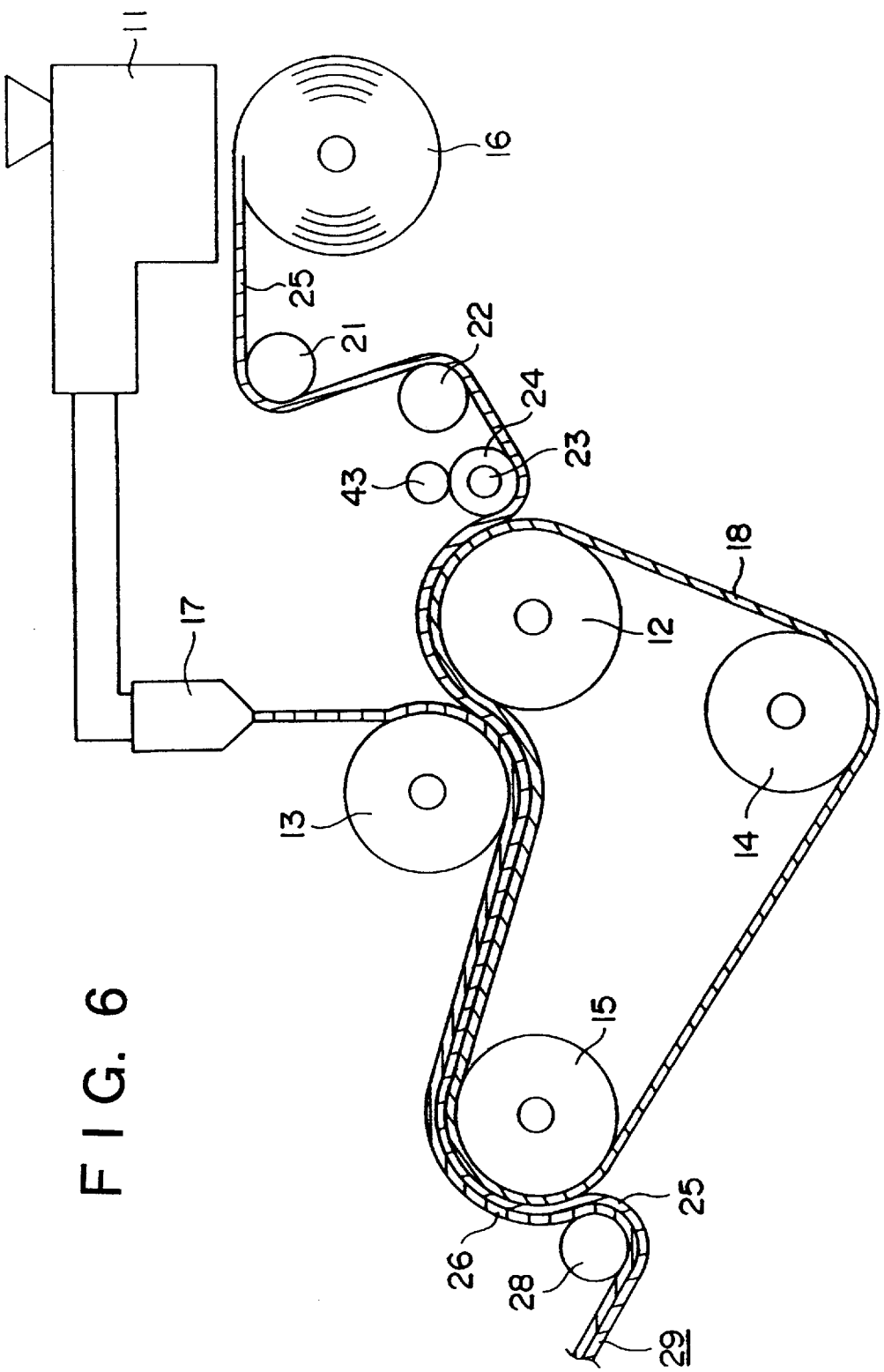
FIG. 6 is a diagrammatic view of an apparatus used in a producing method according to a sixth embodiment of the present invention.

The method for producing the laminated thermoplastic resin film according to a sixth embodiment of the present invention will be explained with reference to FIG. 6.

The producing apparatus used in the producing method of the sixth embodiment is distinguished by providing a temperature controlling roller 43 for the elastic roller 23, but, in the other points, is the same as the producing apparatus according to the fourth embodiment.

More specifically, in the embodiment, on the side approximately opposite to the side of the elastic roller 23 where the elastic roller 23 is abutted onto the thermoplastic resin film 25, the metallic temperature controlling roller 43 is located so as to be abutted onto the circumferential face of the elastic roller 23. In the inside of the temperature controlling roller 43, a passage (not shown) for a heat transfer medium is formed.

The producing method of the laminated thermoplastic resin film 29 according to the embodiment is similar to the fourth embodiment, in which when the thermoplastic resin film 25 preheated by the first and second preheating rollers 21 and 22 is laid on the endless belt 18 through the elastic roller 23, the temperature difference between the temperature of the surface of the elastic roller 23 and the temperature of the heat transfer medium in the elastic roller 23 is retained to be less than 80° C. In order to control the surface temperature of the elastic roller 23 at lower than specified temperature, the temperature controlling roller 43 maintains the difference of the temperature.

[SEVENTH EMBODIMENT]

Figure 7:
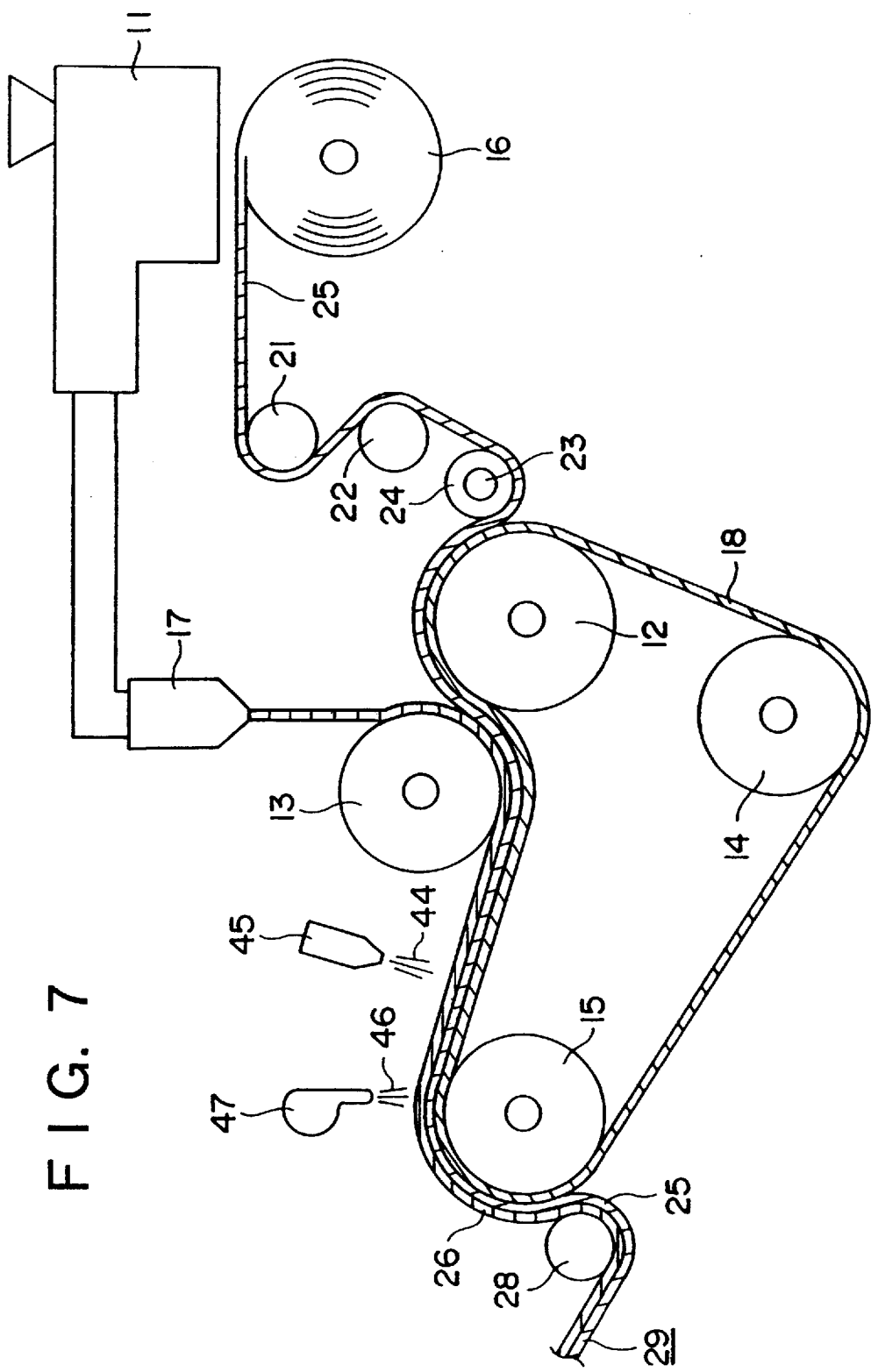
FIG. 7 is a diagrammatic view of an apparatus used in a producing method according to a seventh embodiment of the present invention.

The method for producing the laminated thermoplastic resin film according to a seventh embodiment of the present invention will be explained with reference to FIG. 7.

The producing apparatus used in the producing method of the seventh embodiment is distinguished by providing a spray device 45 for a mist 44 and a spray device 47 for air 46 as cooling means for the laminated first and second thermoplastic resin films 25 and 26, but, in the other points, is the same as the producing apparatus according to the fourth embodiment.

More specifically, in the embodiment, the spray device 45 for the mist 44 is provided at an area by the side of the second thermoplastic resin film 26, corresponding to an approximate middle area between the second roller 13 and the fourth roller 15, and further, the spray device 47 for the air 46 is provided at an area by the side of the second thermoplastic resin film 26, adjacent to the fourth roller 15.

The producing method of the laminated thermoplastic resin film 29 according to the embodiment is similar to the fourth embodiment, in which the mist 44 is sprayed on the laminated first and second thermoplastic resin films 25 and 26 from the mist spray device 45 to cool both laminated thermoplastic resin films 25 and 26, and then, the air 46 is sprayed on the laminated first and second thermoplastic resin films 25 and 26 from the air spray device 47 to cool both laminated thermoplastic resin films 25 and 26. Incidentally, only one of either the mist 44 or the air 46 can be sprayed.

EXPERIMENT 1

In the first embodiment, the laminated thermoplastic resin film 29 is produced under the following concrete conditions of the producing apparatus and the producing method.

Diameter of the first roller to the third roller . . . 1,000 mm

Diameter of the fourth roller . . . 1,000 mm

Thickness of the endless belt . . . 1.0 mm

Speed of the endless belt . . . 30 m/min.

Tension of the first thermoplastic resin film . . . 98.1 N/m width

Preheating temperature of the first thermoplastic resin film . . . 70° C.

Temperature of the heated endless belt . . . 150° C.

Temperature of the second thermoplastic resin film extruded from the die . . . 230 ° C.

Touch-rolling force caused by the endless belt and the second roller . . . 0.098 MPa Pressurized force of the auxiliary roller for touch-rolling . . . 4.9 MPa Temperature of the second roller . . . 120° C.

Temperature of the fourth roller . . . 30° C.

The first thermoplastic resin film . . . a polystyrene film made to have orientation by Inflation method (30 µm). Okuraselomer GH-1 (a trade name), made by Ookura Kougyou Kabushiki Kaisha. Shrinkage factor of the film itself at 110° C. is MD/TD=25/8 (%).

The second thermoplastic resin film . . . high impact polystyrene (HIPS)/white master batch=96/4 (wt %). HIPS: Idemistu Stirol ET-63 (a trade name), made by Idemitsu Petrochemical Co., Ltd.

Thickness of the laminated thermoplastic resin film . . . 0.3 mm

Width of the laminated thermoplastic resin film . . . 1,200 mm

In the experiment, on the face of the first thermoplastic resin film 25 on which the second thermoplastic resin film 26 is laminated, a printed face with ruled squares of 1 mm is formed, thereby as for the obtained laminated thermoplastic resin film 29, the shrinkage factor of the position in a direction transverse to the longitudinal direction (MD direction/TD direction) is evaluated, and further the appearance and the adhesive strength between the thermoplastic resin films 25 and 26 are evaluated. The following Table 1 shows the results.

shrinkage factor (%) of the position of a direction transverse to the longitudinal direction is calculated about the printed face before and after the lamination by measuring with a caliper. In the table, the positive sign means shrinkage and the negative sign means expansion.

The evaluation of the adhesive strength between the thermoplastic resin films 25 and 26 is performed by nicking an approximately 5 mm square on the first thermoplastic resin film 25 of the laminated thermoplastic resin film 29 with a cutter knife, adhering an adhesive tape on the nick of the square, and observing whether the nick of the square is separated or not when the adhesive tape is pulled from the nick of the square in a direction opposite to the adhered direction.

The evaluation of the appearance is performed by watching whether wrinkling, a displacement of the printing pitch, uneven printing, an opened hole or the like has appeared or not, with a visual inspection.

Incidentally, in the column representing the adhesive strength in the table, ○ means no separation.

And, in the column representing the appearance, ○ means that any fault, such as wrinkling, a displacement of the printing pitch, uneven printing or the like, is not produced, and X means that a fault, such as wrinkling, a displacement of the printing pitch, uneven printing, an opened hole or the like, is produced.

The coefficient of variation in pitch is found by measuring the printing pitch of a TD direction (a direction transverse to the longitudinal direction) and an MD direction (a moving direction) of the laminated thermoplastic resin film 29 and the average printing pitch, then finding the standard deviation S of the printing pitch in each direction and applying each value of each direction into the following formula.

$$\text{Coefficient of variation in pitch} = \frac{S}{\overline{\chi}} \quad \text{[FORMULA 1]}$$

$\chi_i$ (i=1~n): printing pitch of the laminated thermoplastic resin film $\overline{\chi}$: average printing pitch of the laminated thermoplastic resin film $$S = \sqrt{\frac{\sum_{i=1}^{n}(\chi_i - \overline{\chi})^2}{n}}$$

The rate of changing pitch is found by measuring the average printing pitch of a TD direction and an MD direction of the first thermoplastic resin film 25 and the average printing pitch of a TD direction and an MD direction of the laminated thermoplastic resin film 29, and applying each value of each direction into the following formula.

$$\text{Rate of changing pitch} = \frac{|\overline{\chi}_a - \overline{\chi}_b|}{\overline{\chi}_b} \times 100 \quad \text{[FORMULA 2]}$$

$\overline{\chi}_b$: average printing pitch of the first thermoplastic resin film $\overline{\chi}_a$: average printing pitch of the laminated thermoplastic resin film

EXPERIMENT 2

In the second embodiment, the laminated thermoplastic resin film 29 is produced under the following same concrete conditions of the producing apparatus and the producing method as in Experiment 1.

As for the laminated thermoplastic resin film 29 of the experiment, the shrinkage factor is evaluated and the appearance and the adhesive strength between the thermoplastic resin films 25 and 26 are evaluated as in the case of Experiment 1. The following Table 1 shows the results.

Incidentally, the coefficient of variation in pitch and rate of changing pitch are evaluated as in the case of Experiment 1. The following Table 2 shows the results.

COMPARISON 1

Figure 10:
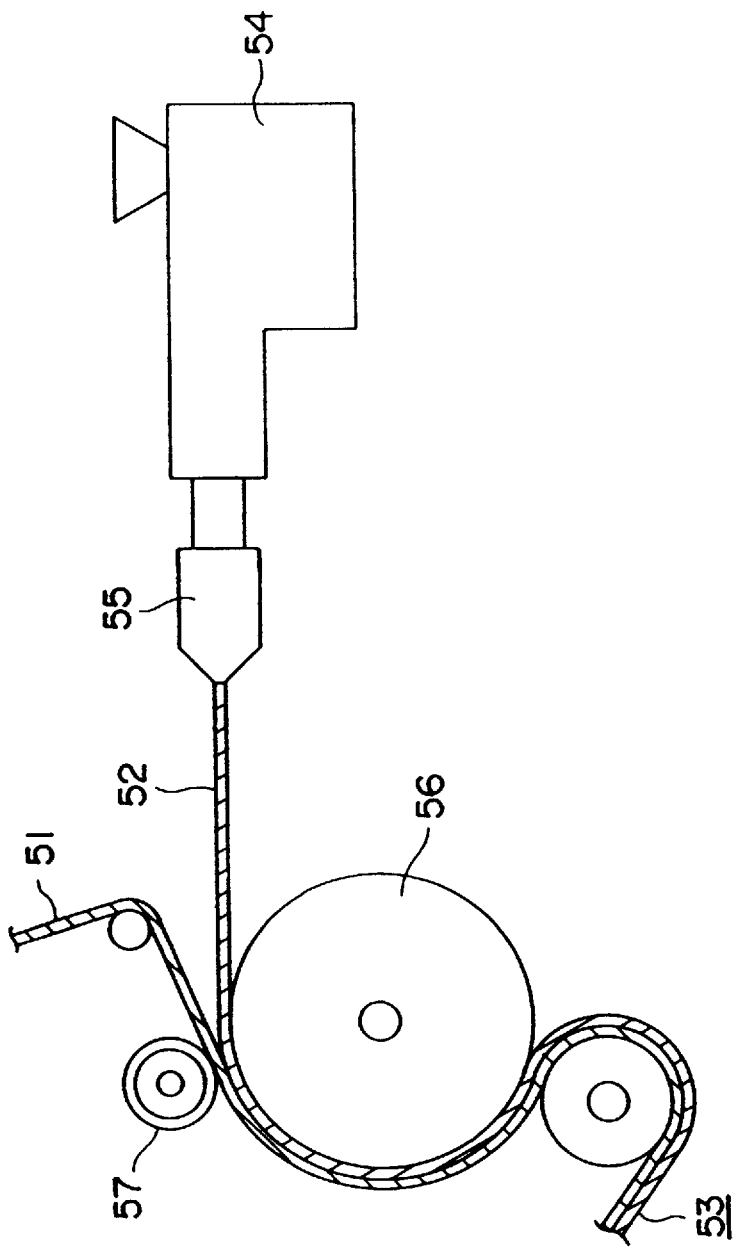
FIG. 10 is a diagrammatic view of an apparatus used in Comparison 1.

With the use of a conventional producing apparatus relating to FIG. 10, the laminated thermoplastic resin film is produced by laminating the same first and second thermoplastic resin films as in Experiment 1.

As for the laminated thermoplastic resin film of the comparison, the shrinkage factor is evaluated and the appearance and the adhesive strength between the thermoplastic resin films are evaluated as in the case of Experiment 1. The following Table 1 shows the results.

Incidentally, the coefficient of variation in pitch and rate of changing pitch are evaluated as in the case of Experiment 1. The following Table 2 shows the results.

TABLE 1

| Shrinkage factor of the position in a direction transverse to the longitudinal direction of the film MD/TD (%) | | | | | |
|---|---|---|---|---|---|
| 100–300 mm from the right end | 100 mm central portion | 100–300 mm from the left end | Average of whole width | Adhesive strength | Appearance |
| E1 −0.3/+0.2 | −0.3/+0.2 | −0.3/+02 | −0.3/+0.2 | ○ | ○ |
| E2 −0.3/+0.2 | −0.3/+0.2 | −0.3/+0.2 | −0.3/+0.2 | ○ | ○ |
| C1 −0.4/+1.0 | −0.4/+0.9 | −0.3/+1.2 | −0.4/+1.1 | ○ | x |

*E1: Experiment 1
*E2: Experiment 2
*C1: Comparison 1

From Table 1, according to the experiments, the first thermoplastic resin film 25 is moved together with the endless belt 18 by being laid on the heated endless belt 18, then the second thermoplastic resin film 26 is superposed on the first thermoplastic resin film 25 lying on the endless belt 18, and thereafter, the first and second thermoplastic resin films 25 and 26 which are laid on the endless belt 18 are touch-rolled with the endless belt 18 and the second roller 13 to be laminated, therefore, as for the obtained laminated thermoplastic resin film 29, it is understood that the shrinkage factor of the position in the direction transverse to the longitudinal direction is smaller, and that the appearance and the adhesive strength between the thermoplastic resin films 25 and 26 are fine.

The laminated thermoplastic resin film 29 of the experiments has the same fine appearance, small shrinkage factor and so on as that produced by a conventional Dry-lamination method.

On the other hand, according to Comparison 1, which is produced by the conventional producing method, it is understood that the obtained laminated thermoplastic resin false has the larger shrinkage factor in the position in the direction transverse to the longitudinal direction, and the appearance is faulty even though the adhesive strength between the thermoplastic resin films is fine.

TABLE 2

|  | Coefficient of variation in pitch [-] | | Rate of changing pitch (%) | |
| --- | --- | --- | --- | --- |
|  | MD | TD | MD | TD |
| Experiment 1 | $0.8 \times 10^{-3}$ | $0.7 \times 10^{-3}$ | 0.3 | 0.2 |
| Experiment 2 | $0.9 \times 10^{-3}$ | $0.7 \times 10^{-3}$ | 0.3 | 0.3 |
| Comparison 1 | $3.4 \times 10^{-3}$ | $3.7 \times 10^{-3}$ | 0.4 | 1.1 |

From Table 2, the coefficient of variation in pitch of the laminated thermoplastic resin film 29 of the experiments is less than $1.0 \times 10^{-3}$ in both the MD direction and TD direction, and it is understood that the entire printing face of the laminated thermoplastic resin film 29 has substantially no displacement and that the printing pitch is fixed.

The rate of changing pitch of the laminated thermoplastic resin film 29 of the experiments is less than 0.5% in both the MD direction and TD direction, and it is understood that the printing pitch is not changed and is sufficiently stable before and after the lamination, since the shrinkage factor of the first thermoplastic resin film 25 is smaller.

On the other hand, the coefficient of variation in pitch of the laminated thermoplastic resin film of Comparison 1 is more than $3.0 \times 10^{-3}$ in both the MD direction and TD direction, and it is understood that the displacement on the printing face is produced and that the printing pitch is uneven.

The rate of changing pitch in the TD direction in the comparison is more than 1.0%, and the laminated thermoplastic resin film of the comparison has large shrinkage in the TD direction (see Table 1), so that the pitch of the printing face especially in the TD direction is extremely changed before and after the lamination, and displacement occurs.

EXPERIMENT 3

Figure 8:
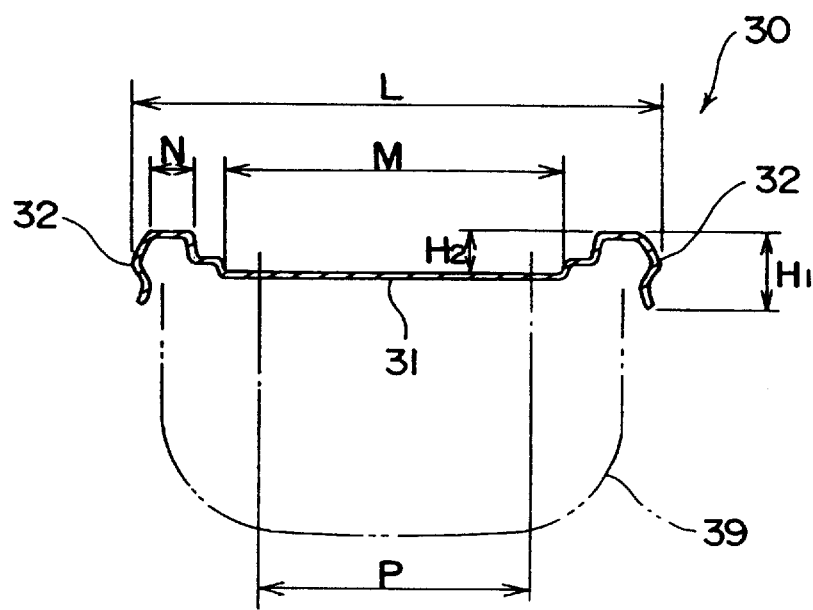
FIG. 8 is a sectional view showing a thermally produced molding of a laminated thermoplastic resin film according to Experiments 3 and 4 of the present invention.

The laminated thermoplastic resin film 29 obtained similarly to Experiment 1 is thermally treated with a hot plate molding machine [made by Asano Kenkyusho], and a lid of a container 39 (shown in phantom) is obtained (see FIG. 8).

The container 39 is used as a container for instant noodles, a cup soup or the like.

The lid 30 is composed of a circular flat face-like portion 31 and an engaging portion 32 for engaging with the container 39, formed to be raised along the circumferential edge of the flat face-like portion 31.

The engaging portion 32 is engaged with the upper end portion of the container 39.

The definite size of each portion of the lid 30 is defined as the following.

Diameter of the lid 30 (M) . . . 180 mm

Diameter of the flat face-lie portion 31 (L) . . . 145 mm

Width of the upper horizontal face of the engaging portion 32 (N) . . . 10 mm

Height from the bottom end of the engaging portion 32 to the upper horizontal face (H1) . . . 12 mm Height from the upper face of the flat face-like portion 31 to the upper horizontal face of the engaging portion 32 (H2) . . . 5 mm The heat treatment of the laminated thermoplastic resin film 29 was carried out under the following conditions.

Time of heating . . . 3.0 sec.

Forming pressure in heating . . . 0.2 MPa

Forming pressure in forming . . . 0.5 MPa

Temperature of a hot-plate . . . 125° C.

Amount of sending pitch . . . 980 mm

Outer diameter of the mold . . . 180 mm

The number of produced moldings . . . 5×5=25 moldings

Thickness of the laminated thermoplastic resin film . . . 0.3 mm

Width of the laminated thermoplastic resin film . . . 1,000 mm

In the experiment, a printed face having squares of 1 mm is formed on the first thermoplastic resin film 25, and on this face with 1 mm squares, the printing face is formed on which five circles 40 of 135 mm in diameter (Q) are arranged in each MD direction and TD direction so that a pitch (R) of 190 mm is provided between the two centers of the circles 40, as shown in FIG. 9.

By using the first thermoplastic resin film 25, the lamination on the second thermoplastic resin film 26 is performed similarly to Experiment 1, and the laminated thermoplastic resin film 29 thereby obtained is thermally treated.

Further, a circular evaluating area P 135 mm in diameter is defined on the central portion (the inside of the flat face-like portion 31) of the lid 30, and the displacement of the squares of 1 mm on the evaluating area P and the positions of the printed circles 40 are evaluated with a visual inspection.

EXPERIMENT 4

Similarly to Experiment 3, the lid 30 is thermally produced from the laminated thermoplastic resin film 29 of Experiment 2, and the displacement of the squares of 1 mm on the evaluating area P and the positions of the printed circles 40 are evaluated with a visual inspection.

COMPARISON 2

Similarly to Experiment 3, the lid is thermally produced from the laminated thermoplastic resin film of Comparison 1, and the displacement of the squares of 1 mm on the evaluating area P and the positions of the printed circles 40 are evaluated with a visual inspection.

In the lid 30 of Experiment 3 and Experiment 4, the squares of 1 mm on the evaluating area P have no displacement and the print of the circle 40 is positioned at the central portion on each of the lids 30.

From the results, it is understood that the printing face of the first thermoplastic resin film 25 of the experiments, even on the laminated thermoplastic resin film 29 after the lamination, retains the printing pitch (R) withstanding pitch forming.

Further, there is no shrinkage, namely the displacement of the printing face, generated by thermal treatment on the thermally produced molding 30 of the laminated thermoplastic resin film 29 of the experiments, therefore it is understood that the thermally produced molding 30 has a sufficient practicality as a pitch formed product.

On the other hand, in the lid of Comparison 2, the squares of 1 mm in the evaluating area P have displacement and are not uniform, and it is observed that a lot of prints of the circles 40 are displaced from the lid.

From the results, it is understood that the printing face of the laminated thermoplastic resin film of Comparison 2 has displacement to an extent that it can not respond to the forming pitch of the thermal molding.

Further, shrinkage is produced on the laminated thermoplastic resin film by heat in thermally producing, therefore it is considered that the displacement of the print is additionally larger.

Accordingly, the thermally produced molding of Comparison 2 are not fit for practical use as a pitch formed product.

EXPERIMENTS 5–7

Based on the third embodiment, the laminated thermoplastic resin film 29 is produced.

In these experiments, the average roughness of the center line of the belt surface Ra is measured by using a micro surface contour detection device "HANDY-SURF E-30A" [a trade name, made by (Kabu) Tokyo Seimitsu]. The following are the performance specifications of the measuring instrument.

Length of measuring L: 4 mm, cut-off $\lambda c$: 0.8 mm, tip of probe diamond (90° circular cone, 5 $\mu$m radius), measuring force: less than 4 mN, cut off method: 2CR type.

The other definite conditions of the producing apparatus and the producing method are the same as in Experiment 1, but the following points are different.

Speed of the endless belt . . . 40 m/min.

Temperature of the second roller . . . 60° C.

Temperature of the fourth roller . . . 50° C.

As for the laminated thermoplastic resin film 29 obtained by each experiment, the surface glossiness of the side on the endless belt 18 was measured. The surface glossiness is found as follows, from the ratio of reflected pencils $\psi o_s$ from the surface of glass having a refractive index 1.567 and reflected pencils $\psi_s$ measured when light irradiated on the film at an incident angle of 60 degrees is received at an angle of reflection of the same 60 degrees, with the use of an automatic colorimetric color-difference meter (e.g., AUD-CH-2 type 45, 60, made by Suga Shikenki Kabushiki Kaisha).

Surface glossiness $Gs=\psi_s/\psi o_s \times 100$

Table 3 shows the results of measuring the average roughness of the center line Ra and the surface glossiness of the laminated thermoplastic resin film 29 according to each experiment and the result of observing a peeling property of the laminated film 29.

TABLE 3

| | Ra of the belt | Glossiness of the film | Peeling property of the laminated film |
|---|---|---|---|
| Experiment 5 | 0.05 $\mu$m | 145% | stably peeling |
| Experiment 6 | 0.20 $\mu$m | 141% | stably peeling |

TABLE 3-continued

| | Ra of the belt | Glossiness of the film | Peeling property of the laminated film |
|---|---|---|---|
| Experiment 7 | 0.70 $\mu$m | 130% | stably peeling |

From Table 3, according to Experiments 5–7, the average roughness of the center line Ra of the surface of the endless belt 18 is defined as 0.001 $\mu$m $\leq$ Ra $\leq$ 0.80 $\mu$m, therefore, it is understood that the peeling property of the laminated thermoplastic resin film 29 from the endless belt 18 is fine. Further, the surface glossiness of the face in the laminated film 29, facing to the endless belt 18, is high, and the surface glossiness is not reduced in the high-speed production. The obtained laminated thermoplastic resin film 29 has smaller shrinkage in the position in a direction transverse to the longitudinal direction, and has a fine appearance and adhesive strength between the thermoplastic resin films 25 and 26.

EXPERIMENTS 8–11

Based on the fifth embodiment, the laminated thermoplastic resin film 29 is produced.

In these experiments, the coating device 42 of the peeling property substance 41 has four nozzles [AKI-JET 04 (a trade name) made by Kabushiki Kaisha Ikeuchi] in a direction transverse to the longitudinal direction of the film 25.

As the peeling property substance 41, silicone emulsion [an aqueous solution diluted by 80 times of SM7025 (a trade name, made by Tore Silicone Kabushiki Kiasha)] in Experiment 8, an aqueous solution of 5 g/1 of corn starch in Experiment 9, an aqueous solution of 5 g/1 of silicone particles in Experiment 10, and an aqueous solution of 5 g/1 of acrylic resin particles in Experiment 11 are used.

The other definite conditions of the producing apparatus and the producing method are the same as in Experiment 1, but the following points are different.

Speed of the endless belt . . . 40 m/min.

Temperature of the second roller . . . 60° C.

Temperature of the fourth roller . . . 50° C.

Table 4 shows a result of evaluating the adhesive strength and the appearance of the laminated thermoplastic resin film 29 according to each experiment similarly to Experiment 1 and a result of observing the peeling property of the laminated film 29.

TABLE 4

| | Peeling property substance | Adhesive strength | Appearance | Peeling property of the lamiated film |
|---|---|---|---|---|
| Experiment 8 | silicone emulsion | ○ | ○ | stably peeling |
| Experiment 9 | corn starch | ○ | ○ | stably peeling |
| Experiment 10 | silicone particle | ○ | ○ | stably peeling |
| Experiment 11 | acrylic particle | ○ | ○ | stably peeling |

From Table 4, according to Experiments 8–11, it is understood that as a result of coating the first thermoplastic resin film 25 with the peeling property substance 41 during production, the laminated thermoplastic resin film 29 has fine peeling property from the endless belt 18. The obtained laminated thermoplastic resin film 29 has small shrinkage, and a fine appearance and adhesive strength between the thermoplastic resin films 25 and 26.

EXPERIMENTS 12–14

Based on the sixth embodiment, the laminated thermoplastic resin film 29 is produced.

In these experiments, the thickness of the elastic portion 24 of the elastic roller 23, the surface temperature of the elastic roller 23, and the temperature of the heat transfer medium in the elastic roller 23 are defined as indicated in the following Table 4. Incidentally, the temperature controlling roller 43 (the surface temperature 40° C.) is used in Experiments 13 and 14, but is not used in Experiment 12.

The concrete conditions of the producing apparatus and the producing method in each experiment are the same as in Experiment 1.

As for each experiment, the coefficient of variation in pitch and the rate of changing pitch are measured similarly to Experiment 1. The results are shown in Table 5.

TABLE 5

| | Thickness of elastic roller | Tem. 1 | Tem. 2 | Tem. 3 | Coefficient of variation in pitch [–] | | Rate of changing pitch | |
|---|---|---|---|---|---|---|---|---|
| | | | | | MD | TD | MD | TD |
| E12 | 5 mm | 50° C. | 40° C. | — | $0.5 \times 10^{-3}$ | $0.5 \times 10^{-3}$ | 0.2% | 0.2% |
| E13 | 10 mm | 57° C. | 40° C. | use | $0.5 \times 10^{-3}$ | $0.5 \times 10^{-3}$ | 0.2% | 0.2% |
| E14 | 5 mm | 48° C. | 40° C. | use | $0.5 \times 10^{-3}$ | $0.5 \times 10^{-3}$ | 0.2% | 0.2% |

*E12: Experiment 12
*E13: Experiment 13
*E14: Experiment 14
*Tem. 1: Surface temperature of the elastic roller
*Tem. 2: Temperature inside the elastic roller
*Tem. 3: Temperature controlling roller From Table 5, according to Experiments 12–14, the laminated thermoplastic resin film 29 is produced with the temperature difference between the surface temperature of the elastic roller 23 and the temperature of the heat transfer medium inside the elastic roller 23 being maintained to be less than 80° C., therefore, it is understood that the coefficient of variation in pitch and the rate of changing pitch are small and the printing pitch is stable as compared with the laminated thermoplastic resin film 29 according to Experiments 1 and 2.

EXPERIMENTS 15–17

Based on the seventh embodiment, the laminated thermoplastic resin film 29 is produced.

Incidentally, only the air 46 is sprayed in Experiment 15, and only the mist 44 is sprayed in Experiment 16, while both the air 46 and the mist 44 are sprayed in Experiment 17.

In these experiments, the spray device 45 of the mist 44 has five nozzles [AKI-JET 04 (a trade name)] arranged at equal intervals in the lateral direction of the film of 1,200 mm. The mist 44 is produced by spraying tap water.

The spray device 47 of the air 46 has the degree of opening of 1 mm and a lip having the width of 1,200 mm, and the air 46 is sprayed by using the device 47 under the conditions of air quantity of 6.1 m³/min., static pressure of 2,100 mmAq, the air temperature of 50° C. at the outlet of the lip.

The other concrete conditions of the producing apparatus and the producing method are the same as those in Experiment 1, but the following points are different.

Speed of the endless belt . . . 40 m/min.
Temperature of the second roller . . . 60° C.
Temperature of the fourth roller . . . 50° C.

In each experiment, the surface temperature of the laminated film 29 just after passing the second heating roller 13 and the surface temperature of the laminated film 29 just before passing the peeling roller 28 are measured, and the peeling property of the laminated film 29 is observed. The results are shown in Table 6.

TABLE 6

| | Cooling means | Temperature of the film ① | Temperature of the film ② | Peeling property of the laminated film |
|---|---|---|---|---|
| E15 | air | 131° C. | 68° C. | stably peeling |
| E16 | mist | 131° C. | 74° C. | stably peeling |
| E17 | mist and air | 131° C. | 61° C. | stably peeling |

*E15: Experiment 15
*E16: Experiment 16
*E17: Experiment 17
*Temperature of the film ①: the surface temperature of the laminated film just after passing the second heating roller
*Temperature of the film ②: the surface temperature of the laminated film just before passing the peeling roller From Table 6, according to Experiments 15–17, during production, at least one of either the mist 44 or the air 46 is sprayed on the first and second films 25 and 26 which are laminated by the first and second rollers 12 and 13, so that the laminated film 29 is able to be effectively cooled. Accordingly, as compared with the case in which the endless belt 18 is cooled by only the fourth roller 15, the cooling efficiency is larger, consequently the laminated film 29 is able to be stably peeled from the endless belt 18.

The obtained laminated thermoplastic resin film 29 has small shrinkage in a direction transverse to the longitudinal direction, and has the fine appearance and adhesive strength between the thermoplastic resin films 25 and 26.

What is claimed is:

1. A method for producing a laminated thermoplastic resin film, comprising the steps of:
    moving a first thermoplastic resin film together with a heated metal belt by laying said first thermoplastic resin film on the belt, wherein the belt has a centerline surface roughness, Ra between 0.001 μm and 0.8 μm;
    molding a second thermoplastic film by extruding said second thermoplastic film from a die of an extruder;
    superposing said second thermoplastic resin film on a surface of said first thermoplastic resin film opposite a surface of said first thermoplastic film disposed on the belt; and
    applying a roller to a surface of said second thermoplastic film opposite a surface of said second thermoplastic film disposed on said first thermoplastic film and compressing said first and second thermoplastic resin films laid between the belt and the roller to laminate said first and second thermoplastic resin films together.

2. The method for producing the laminated thermoplastic resin film according to claim 1, wherein the belt is an endless belt that is formed as a circle and wound on and between at least two rollers and the roller used with the belt to compress the first and second thermoplastic films and one of the rollers located inside the circle of the endless belt are arranged adjacent each other to compress the first and second thermoplastic films and the belt.

3. The method for producing the laminated thermoplastic resin film according to claim 1, wherein said first thermoplastic resin film is laid on the belt by an elastic roller having an elastic portion on the surface thereof.

4. The method for producing the laminated thermoplastic resin film according to claim 3, wherein the temperature difference between the temperature of the surface of said elastic roller and the temperature of a heat transfer medium inside said elastic roller is maintained to be less than 80° C.

5. The method for producing the laminated thermoplastic resin film according to claim 3, wherein: the elastic portion of the elastic roller has a temperature and the temperature of the elastic portion is controlled by a temperature controlling roller that abuts the surface of the elastic portion of the elastic roller.

6. The method for producing the laminated thermoplastic resin film according to claim 1, wherein said first thermoplastic resin film laid on the belt is preheated to more than 40° C.

7. The method for producing the laminated thermoplastic resin film according to claim 1, wherein said compression of the first and second thermoplastic resin films by a combination of the belt and the roller is carried out at more than 0.01 MPa.

8. The method for producing the laminated thermoplastic resin film according to claim 1, further comprising the step of coating a peeling property substance on the surface of said first thermoplastic resin film which is disposed on the belt prior to laying the first thermoplastic resin film on the belt.

9. The method for producing the laminated thermoplastic resin film according to claim 1, further comprising the steps of, after compressing said first and second thermoplastic resin films:
cooling said laminated first and second thermoplastic resin films by a cooling means; and
peeling said laminated first and second thermoplastic resin films from the belt.

10. The method for producing the laminated thermoplastic resin film according to claim 1, wherein an auxiliary roller is arranged against a side of the belt opposite a side of the belt against which the first thermoplastic film is disposed for assisting in said compression of said first and second thermoplastic resin films by the belt and the roller.

11. The method for producing the laminated thermoplastic resin film according to claim 1, wherein:
after said second thermoplastic film is extruded, said second thermoplastic film is directed to contact the roller prior to superposing said second thermoplastic film on said first thermoplastic film; and
after said second thermoplastic film contacts said roller, said second thermoplastic film is superposed on said first thermoplastic film.

12. The method for producing a laminated thermoplastic resin film according to claim 1, wherein: said first thermoplastic resin film is a polystyrene film; and said second thermoplastic resin film is a polystyrene film that is different from the polystyrene film forming said first thermoplastic resin film.

13. The method for producing a laminated thermoplastic resin film according to claim 12, wherein said first thermoplastic resin film has a face with printing thereon so that after said first and second thermoplastic resin films are laminated together, the laminated film has a face with printing thereon.

14. A laminated thermoplastic resin film produced by the following method oft
moving a first thermoplastic resin film, laid on a heated metal belt, together with the belt, wherein the belt has a centerline surface roughness, Ra of between 0.001 μm and 0.8 μm;

extruding a second thermoplastic film from a die of an extruder;
superposing said second thermoplastic resin film on a surface said first thermoplastic resin film opposite a surface of said thermoplastic film disposed on the belt; and
applying a roller to a surface of said second thermoplastic film opposite a surface of said second thermoplastic film disposed on said first thermoplastic film and compressing said first and second thermoplastic resin films between the belt and the roller to laminate said first and second thermoplastic resin films together.

15. The laminated thermoplastic resin film produced according to the method of claim 14, wherein: said first thermoplastic resin film is a polystyrene film; and said second thermoplastic resin film is a polystyrene film that is different from the polystyrene film forming said first thermoplastic resin film.

16. The laminated thermoplastic resin film produced according to the method of claims 15, wherein said first thermoplastic resin film has a face with printing thereon so that after said first and second thermoplastic resin films are laminated together, the laminated film has a face with printing thereon.

17. A thermally produced molding produced by the following method of:
moving a first flat thermoplastic resin film, laid on a heated metal belt, together with the belt, wherein the belt has a centerline surface roughness, Ra of between 0.001 μm and 0.8 μm;
molding a second thermoplastic resin film by extruding said second thermoplastic film from a die of an extruder;
superposing said second thermoplastic resin film on a surface of said first thermoplastic resin film opposite a surface of said first thermoplastic film disposed on the belt;
applying a roller to a surface of said second thermoplastic film opposite a surface of said second thermoplastic film disposed on said first thermoplastic film and compressing said first and second thermoplastic resin films between the belt and the roller to produce a laminated thermoplastic resin film; and
heat-treating said laminated thermoplastic resin film.

18. The thermally produced molding of the laminated thermoplastic resin film according to claim 17,
wherein said first and second thermoplastic resin films are formed from polystyrene resins; and
wherein said first thermoplastic resin film has a face with printing thereon so that after said first and second thermoplastic films are laminated together, the molding has a face with printing thereon.

19. The thermally produced molding of the laminated thermoplastic resin film according to claim 17, wherein said thermally produced molding produced from said laminated thermoplastic resin film is a lid of a container.

20. The molding produced according to claim 18, wherein the polystyrene resin forming said first thermoplastic resin film is different from the polystyrene resin forming the second thermoplastic resin film.

21. The molding produced according to claim 18, wherein after the laminated thermoplastic film is heat-treated, the laminated thermoplastic resin film is subjected to a molding process to produce a three-dimensional molding.

* * * * *